(12) United States Patent
Sato

(10) Patent No.: US 7,344,779 B2
(45) Date of Patent: Mar. 18, 2008

(54) MAGNETIC POWDER

(75) Inventor: Kimitaka Sato, Saitama-ken (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 395 days.

(21) Appl. No.: 10/912,156

(22) Filed: Aug. 6, 2004

(65) Prior Publication Data

US 2005/0048282 A1 Mar. 3, 2005

(30) Foreign Application Priority Data

Aug. 28, 2003 (JP) ............................. 2003-304930

(51) Int. Cl.
*G11B 5/66* (2006.01)
*G11B 5/70* (2006.01)

(52) U.S. Cl. ................. 428/403; 428/842.4; 428/842.6

(58) Field of Classification Search ............. 428/842.4, 428/842.6

See application file for complete search history.

(56) References Cited

U.S. PATENT DOCUMENTS 6,139,946 A * 10/2000 Bailey et al. ............... 428/323
2004/0112472 A1* 6/2004 Pereira et al. .............. 148/300

FOREIGN PATENT DOCUMENTS

JP 2002-289415 4/2002

* cited by examiner

*Primary Examiner*—Holly Rickman
(74) *Attorney, Agent, or Firm*—Clark & Brody

(57) ABSTRACT

A fine magnetic powder suitable for magnetic tape capable of high-density magnetic recording is provided that helps to prevent degradation of tape surface property and durability with increasing fineness of the magnetic powder particles, which magnetic powder consists of particles composed chiefly of Fe whose surface layer contains an oxide of at least one of Al, Si and Ra (where Ra represents one or more rare earth elements, defined as including Y), has an average particle diameter of less than 70 nm, the number of basic sites on the particle surface of not greater than 0.85 sites/nm$^2$, and the number of acid sites on the particle surface of not greater than 0.75 sites/nm$^2$.

4 Claims, 1 Drawing Sheet

MAGNETIC POWDER

BACKGROUND OF THE INVENTION

1. Field of the Invention

This invention relates to a magnetic powder composed of particles suitable for forming a magnetic layer of a coating-type magnetic recording medium such as a magnetic tape or magnetic disk, particularly to a magnetic powder whose catalytic action is inhibited even when composed of fine particles.

2. Background Art

Magnetic recording media are today desired to have not only enhanced recording capacity but also improved reliability and durability. An intense effort is therefore underway to boost the recording capacity of next-generation magnetic recording media by using short wavelength signals to realize high recording density. The achievement of this goal will require a magnetic powder consisting of fine particles and exhibiting excellent properties. Unless the particle size is much smaller than the length of the region for recording the short-wavelength side signal, a distinct magnetic transition cannot be produced, making practical recording impossible. The particle size of the magnetic powder is therefore required to be sufficiently small.

To realize higher recording density, the resolution of the recording signal must be increased. Reduction of magnetic recording medium noise is therefore important. Noise is usually attributable to particle size and tape surface property. The finer the particles and the smoother tape surface, the lower the noise becomes. This also makes it necessary for a magnetic powder used for high density recording to have sufficiently small particle size.

On the other hand, the importance of avoiding damage to stored data increases with increasing storage capacity of the magnetic recording medium. A tape or the like for data storage is therefore required to have enhanced reliability. A tape with improved storage stability is therefore desired.

In light of these circumstances, acicular magnetic powders for magnetic recording media have been developed that are composed chiefly of Fe and consist of particles having an average major axis diameter of 70 nm or less (see JP 2002-289415A, for example).

A coating material formed using a magnetic powder experiences declines in stability and storability with decreasing average particle diameter of the magnetic powder. A magnetic tape produced using the coating material therefore suffers irregular surface property, and when the tape is used, it tends to induce generation of substances that stick to the magnetic head. The tendency for such tape degradation to occur not only intensifies with decreasing particle diameter but becomes particularly strong in an acicular magnetic powder composed chiefly of Fe when the magnetic powder contains elements added for the purpose of preventing sintering and/or oxidation, such as Al, Si, Ra (where Ra represents one or more rare earth elements, defined as including Y) and the like.

Thus the inventor became aware of a new problem regarding the development of magnetic powders for enhancing the capacity of magnetic recording media. Specifically, the inventor discovered that progress in increasing the fineness and enhancing the quality of magnetic powders may be accompanied by a decline in the quality of magnetic tapes produced using the magnetic powders. An object of the present invention is to overcome this problem.

SUMMARY OF THE INVENTION

For overcoming the problem described above, the present invention provides a magnetic powder consisting of particles composed chiefly of Fe whose surface layer contains an oxide of at least one of Al, Si and Ra (where Ra represents one or more rare earth elements, defined as including Y), which magnetic powder has an average particle diameter of less than 70 nm, the number of basic sites on the particle surface of not greater than 0.85 sites/$nm^2$, and the number of acid sites on the particle surface of not greater than 0.75 sites/$nm^2$. Hereinafter, the number of basic sites on the particle surface of not greater than 0.85 sites/$nm^2$ is merely represented as "not greater than 0.85 basic sites/$nm^2$", and the number of acid sites on the particle surface of not greater than 0.75 sites/$nm^2$ is merely represented as "not greater than 0.75 acidic sites/$nm^2$".

The best way to obtain the magnetic powder according to the present invention is to subject magnetic powder consisting of particles composed chiefly of Fe whose surface layer contains an oxide of at least one of Al, Si and Ra (where Ra represents one or more rare earth elements, defined as including Y) and whose average particle diameter is less than 70 nm to a method of (1) treatment at a temperature exceeding 180° C. followed by gentle oxidation treatment, (2) surface treatment with a silane coupling agent, and (3) surface treatment with an alcohol and/or polyalcohol.

A magnetic powder that has not greater than 0.85 basic sites/$nm^2$ and not greater than 0.75 acidic sites/$nm^2$ does not experience the problem explained above even though it is a magnetic powder consisting of particles composed chiefly of Fe whose surface layer contains an oxide of at least one of Al, Si and Ra and whose average particle diameter is less than 70 nm. Therefore, as indicated by the Examples set out later, it can impart excellent tape smoothness and durability while maintaining good magnetic properties.

DESCRIPTION OF THE PREFERRED EMBODIMENTS

Figure 1:
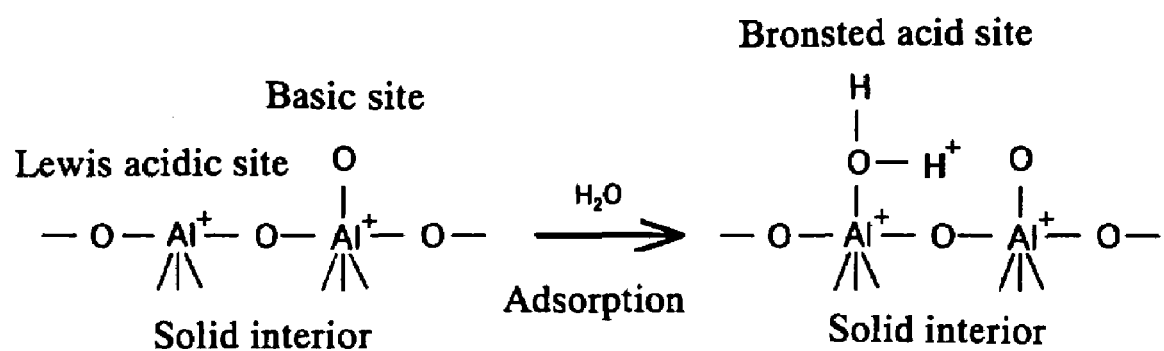
FIG. 1 is a diagram illustrating presence of acidic sites and basic sites in the case where alumina is present on the surface of a solid.

In order to solve the aforesaid problem of tape smoothness and durability degradation and head fouling increasing with smaller average particle size of the magnetic powder and incorporation of additive elements like Al, Si and Ra, it was first necessary to learn the underlying cause. The inventor conducted various experimentation and research to this end. As a result, it was found that the main reason for the problem is that decrease in the average particle size of the magnetic powder and increase in its content of Al, Si, Ra and other additive elements cause a proportional increase in the number of acidic sites and basic sites therein (such sites being an ongoing subject of research particularly in the catalytic chemistry field). In its ordinary state (conventional state), a magnetic powder that has smaller particle diameter and more additive element oxides present in the surface layer of the particles more strongly catalyzes chemical reaction of the resin component or other organic compound forming the magnetic layer.

The gist of the present invention lies in controlling this catalytic activity of a fine magnetic powder to a condition favorable for a magnetic recording medium. Catalysts that promote chemical reaction are of two types: basic catalysts and acid catalysts. A fine magnetic powder consisting of particles composed chiefly of Fe whose surface layer contains an oxide of at least one of Al, Si and Ra can become either a basic catalyst or an acid catalyst.

For example, a fine magnetic powder having an alumina surface layer can be either a basic catalyst or an acid catalyst. As shown by the model in FIG. 1, when the magnetic powder particle has an alumina surface, separation and dissociation of an OH group at an unsaturated bonding portion on the surface result in generation of a Lewis acid site and a basic site, respectively. In FIG. 1, the Lewis acid point that adsorbs water in the state on the left side changes to a Bronsted acid site. A Lewis acid site is an active point that accepts an electron, a Bronsted acid site is an active point that releases a proton, and a basic site is an active point that releases an electron. This principle applies not only to alumina but likewise to $SiO_2$ and Ra oxides present on the surface.

The number of basic sites present on the particle surface can be evaluated from the number of acidic substance molecules adsorbed thereon. Assuming that one acidic substance molecule is adsorbed at each basic site, it would follow that the number of adsorbed acidic substance molecules corresponds to the number of basic sites. It is known however that in actuality two acidic substance molecules sometimes attach to a single basic site and a single acidic acid molecule sometimes attaches across two basic sites. The inventor's experiments nevertheless demonstrated that when $CO_2$ gas is used as the adsorbed substance, the number of basic sites of the magnetic powder can be evaluated with good accuracy from the amount of adsorbed $CO_2$. It was also learned that when $NH_3$ gas is used as a basic adsorbed substance, the number of acidic sites present on the magnetic powder particle surfaces can be similarly evaluated with good accuracy from the amount of adsorbed $NH_3$ gas.

In other words, there is good correlation between number of magnetic powder basic sites and the magnetic powder $CO_2$ adsorption (μL/g) and there is good correlation between number of magnetic powder acidic sites and the magnetic powder $NH_3$ adsorption (μL/g). In this specification, the number of basic sites and number of acidic sites of a magnetic powder are therefore evaluated using these correlations. The evaluations can be conducted as described below.

Basic Sites Evaluation

Load the specimen powder into a Chemisorption-Physisorption Analyzer-ChemBET 3000 (product of Quantachrome Instruments). Using high-purity $CO_2$ gas as the adsorption gas, measure the $CO_2$ adsorption (microliter·μL) per gram of the specimen powder. Follow the operating procedure specified for the analyzer at the time of conducting the measurement. Specifically, remove water adhering to the specimen powder by superheating in an inert gas such as $N_2$ or argon gas and purge the analyzer passages of air using an inert gas. Then inject the $CO_2$ into the specimen powder and start measurement of the $CO_2$ adsorption.

Acidic Sites Evaluation

Load the specimen powder into a Chemisorption-Physisorption Analyzer-ChemBET 3000 (product of Quantachrome Instruments). Using high-purity $NH_3$ gas as the adsorption gas, measure the $NH_3$ adsorption (microliter·μL) per gram of the specimen powder. Follow the operating procedure specified for the analyzer at the time of conducting the measurement. Specifically, remove water adhering to the specimen powder by superheating in an inert gas such as $N_2$ or helium gas and purge the analyzer passages of air using an inert gas. Then inject the $NH_3$ into the specimen powder and start measurement of the $NH_3$ adsorption.

In accordance with the present invention, it was clarified that when the magnetic powder is found by these measurements to have not greater than 0.85 basic site/$nm^2$ and not greater than 0.75 acidic site/$nm^2$, then even if it is a fine powder composed of magnetic particles composed chiefly of Fe whose surface layer contains an oxide of at least one of Al, Si and Ra and whose average particle size is less than 70 nm, a magnetic layer formed using the magnetic powder can be substantially protected from the degradation of smoothness and durability heretofore experienced, thereby making it possible to achieve excellent tape smoothness and durability while maintaining good magnetic properties. Specifically, it is possible to inhibit catalytic action of the magnetic powder which would otherwise work to induce chemical reaction with respect to the resin, solvent and other organic compounds constituting the magnetic layer. As a result, it becomes possible to maintain tape coating stability, storage property, production efficiency and tape surface properties, and, in addition, to avoid magnetic layer degradation/degeneration, generation of magnetic layer decomposition products, and other such problems so thoroughly that they do not become a concern in practical utilization.

The number of basic sites and acidic sites can be calculated from the $CO_2$ adsorption and $NH_3$ adsorption using the following yardstick. Define the $CO_2$ adsorption of the magnetic powder measured by the foregoing method as Q (μL/g), the specific surface area thereof as P ($m^2$/g) and the density of the adsorbed gas (at 25° C., the temperature at which the gas adsorption was measured) is defined as G (g/L). Then, defining Avogadro's constant ($6.02 \times 10^{23}$ atoms/mol) as N, the number of basic sites (sites/$nm^2$) can be calculated from the following equation:

Number of basic sites (sites/$nm^2$)=[$N \cdot Q$(μL/g)·$G$(g/L) ·$10^{-24}$]/[$P$($m^2$/g)·(molecular weight of $CO_2$:44)].

Similarly, defining the $NH_3$ adsorption as R (μL/g), the number of acidic sites (sites/$nm^2$) can be calculated from the following equation:

Number of acidic sites (sites/$nm^2$)=[$N \cdot R$(μL/g)·$G$(g/L)·$10^{-24}$]/[$P$($m^2$/g)·(molecular weight of $NH_3$:17)].

The density of the adsorbed gases G (g/L) can be calculated from the following equation:

$G$(g/L)=ρ×(273.15/298.15), where ρ is the standard state (0° C., 1 atm.) gas density (1.9796 g/L for $CO_2$ and 0.7710 g/L for $NH_3$).

The tests conducted by the inventor will now be summarized.

A ketone is generally used as the solvent of the coating material (containing dispersed magnetic powder) used to form the magnetic layer of a magnetic recording medium. It is therefore practical to use a ketone as the specimen for evaluating the effect (catalytic activity) of the magnetic powder basic sites and acidic sites on an organic compound. As the specimen for evaluating magnetic powder catalytic activity, the inventor chose cyclohexanone as a typical ketone. However, inventor also confirmed that ketones other than cyclohexanone exhibit similar catalytic activity.

One index available for evaluating the effect of magnetic powder catalytic action on an organic compound (cyclohexanone) is the temperature increase (ΔT) when the magnetic powder and organic compound are mixed. The higher the catalytic activity, the greater is the temperature increase (ΔT)

produced when the magnetic powder and organic compound are mixed owing to the immersion heat of the magnetic powder and organic compound and the condensation reaction heat of the organic compound.

The effect of magnetic powder catalytic action on an organic compound (cyclohexanone) can also be evaluated from increase in C/Fe atomic percent (ΔC) caused by C originating in oligomers (dimers-trimers) produced by condensation reaction of the cyclohexanone. Cyclohexanone condensation reaction is known to produce several types of dimers and trimers. These condensation reaction products formed on the magnetic powder surface separate from volatile non-condensation products during drying to remain on the magnetic powder surface and can be detected as increase in C/Fe atomic percent (ΔC) caused by C originating in the oligomers.

ΔT Evaluation

The procedure in the actual ΔT evaluation test is as follows. Twenty grams of the magnetic powder is placed in a sealed adiabatic container in a 25° C. atmosphere, whereafter 20 g of cyclohexanone adjusted to 25° C. is added to the container. The temperature of the slurry (magnetic powder+cyclohexanone) is then measured. The slurry temperature gradually rises until reaching a constant value. The difference between the temperature at this time and 25° C. is defined as ΔT.

ΔC Evaluation

The procedure in the actual ΔC evaluation test is as follows. Twenty grams of the magnetic powder is placed in a container, 20 g of cyclohexanone is added thereto, and the slurry is held at 60° C. for 5 hours. The liquid is removed by filtering, and the solid component is thoroughly predried in air and completely removed of volatile components by vacuum-drying at 25° C. The C and Fe content before and after the reaction are analyzed and the C content is expressed as C/Fe (at. %). The increase (at. %) in C content is defined as ΔC.

ΔC(at. %)=[Post-reaction C/Fe (at. %)]−[Pre-reaction C/Fe(at. %)]

In the invention magnetic powder regulated to have not greater than 0.85 basic sites/nm$^2$ and not greater than 0.75 acidic sites/nm$^2$ [acicular magnetic powder composed chiefly of Fe whose surface layer contains an oxide of at least one of Al, Si and Ra and whose average particle diameter (actually the average major axis length) is less than 70 nm], the value of ΔT is less than 8.0° C. and the value of ΔC is less than 120 at. %.

The features defining the invention will now be further explained.

The average particle diameter of the magnetic powder according to the present invention is less than 70 nm. This is because the problem of catalytic activity that arises when the average particle diameter is less than 70 nm must be solved to avoid problems from occurring in practical use. In other words, one feature of the present invention is that it overcomes the problem of catalytic activity that emerges when the average particle diameter of the magnetic particles is less than 70 nm. The size of the magnetic powder particles can be calculated from a transmission electron micrograph.

The size of the particles as expressed in particle volume is preferably 1000-10000 nm$^3$. When the particle volume is smaller than 1000 nm$^3$, superparamagnetism occurs owing to thermal fluctuation and dispersion becomes difficult. A magnetic powder whose particle volume is greater than 10000 nm$^3$ is not suitable for a medium of low noise in terms of magnetic conversion property.

In the case of a magnetic powder with acicular particles, average particle diameter means the average major axis length of the acicular particles. The particles of a magnetic powder are not required to be of any particular shape such as acicular (including spindle-like and flat-acicular-like), ellipsoid, granular, spherical or the like. Thus while the particles can be of any shape whatsoever, the effect of the present invention is especially great when a magnetic powder having particles of acicular (including spindle-like and flat-acicular-like) shape are used, because such a magnetic powder is usually added with one or more elements like Al, Si and Ra whose oxides have an effect on the catalytic activity of the magnetic powder.

The present invention applies to magnetic powders composed chiefly of Fe. Some of the Fe can be replaced with Co. The Co content expressed as Co/Fe atomic percent can be 50 at. % or less, preferably 20-50 at. %. The present invention can also be applied to magnetic powders composed chiefly of Fe that are alloy powders of, for example, a-Fe, Fe—Ni, Fe—Co, Fe—Co—Ni or Fe—Pt, or that are not alloy powders but iron compound powders of, for example, iron carbide, iron nitride or iron oxide.

The magnetic powder preferably has a specific surface area measured by the BET (Brunauer-Emmett-Teller) method of 55 m$^2$/g or greater. When the specific surface area is less than 55 m$^2$/g, the particles become too large and unsuitable for a medium of low noise in terms of magnetic conversion property.

The Al content of the magnetic powder expressed as Al/Fe atomic percent is preferably 5-35 at. %, more preferably 10-30 at. %, the Si content thereof expressed as Si/Fe atomic percent is preferably 0.1-10 at. %, more preferably 1-6 at. %, and the Ra (rare earth element, defined as including Y) content thereof expressed as Ra/Fe atomic percent is preferably 4-20 at. %, more preferably 5-10 at. %. Special care is required regarding the Ra content because when excessive Ra is added, the Ra oxide exhibits strong catalytic activity and the number of basic sites and acidic sites becomes very high.

The sintering-preventing effect and shape-retaining effect of these added elements generally tend to decrease with increasing fineness of the magnetic powder. It is therefore advantageous to increase the amount of adhering rare earth element(s) (Ra). However, it was found that while increasing the amount of Ra adherence enhanced the sinter-preventing and shape-retaining effects, it also tended to increase catalytic activity. But experiments conducted by the inventor showed that in an acicular magnetic powder whose Ra/Fe atomic percent is less than 10 at. %, it is possible by regulating the powder to not greater than 0.85 basic site/nm$^2$ and not greater than 0.75 acidic site/nm$^2$ to achieve ΔT of less than 8.0° C. and ΔC of less than 120 at. %.

A magnetic powder of acicular (spindle-like, flat-needle-like) particles composed chiefly of Fe was produced from a starting material of acicular iron oxide particles obtained by dehydrating hydrous iron oxide by the usual method at a temperature of 200-600° C. The magnetic powder composed chiefly of Fe obtained by reducing this starting material by heating in hydrogen gas at 300-700° C. in the usual way could be incorporated within the particles or on the surface of the particles with Al, Si, Ra, Co and other such heterogeneous elements ordinarily used to improve various properties. Of particular note is than when Al, Si and Ra were incorporated within the foregoing ranges, oxides of the elements were present in the particle surface layer and helped to improve prevention of interparticle sintering, particle shape retention and magnetic properties, but as mentioned above, proliferation of basic sites and acidic sites occurred readily. Another feature of the present invention is that it is directed to overcoming this problem caused by the oxides of Al, Si and Ra. It is worth noting that the oxygen content of the magnetic powder is preferably not greater than 26 wt % of the whole particle.

The present invention provides a magnetic powder composed chiefly of Fe that has not greater than 0.85 basic site/$nm^2$ and not greater than 0.75 acidic site/$nm^2$ even though its particles have an average diameter of less than 70 nm and contain oxides of Al, Si and Ra in their surface layers. Such a magnetic powder can be obtained by subjecting the magnetic powder consisting of particles composed chiefly of Fe whose surface layer contains an oxide of at least one of Al, Si and Ra and whose average particle diameter is less than 70 nm that was obtained by the final heat treatment to gentle oxidation treatment after once heat-treating it at a temperature higher than 180° C. This heat treatment following reduction is preferably carried out in a reducing or inert gas atmosphere or optionally in a wet hydrogen atmosphere to which steam has been added. For example, heat treatment can be carried out in a hydrogen gas atmosphere containing 2-20 vol. % of steam for 5-60 min. at a temperature in the range of 180-400° C., followed by gentle oxidation treatment. The gentle oxidation treatment can be conducted by holding the magnetic powder at a temperature of 40-200° C. for about 10-120 min. in a nitrogen gas atmosphere having an oxygen concentration of 0.01-1 vol. %.

By conducting the gentle oxidation after heat treatment at a temperature exceeding 180° C. in this manner, the number of basic sites and acidic sites can be regulated to not greater than 0.85 site/$nm^2$ and not greater than 0.75 site/$nm^2$, respectively, and the values of ΔT and ΔC mentioned earlier can be made less than 8.0° C. and less than 120 at. %, respectively. When the desired number of basic sites and acidic sites cannot be achieved owing to some other factor, it suffices to repeat the aforesaid processing multiple times.

When the final reduction step in the production of the magnetic powder is conducted by reduction under heating in hydrogen gas, increase in the number of basic sites and acidic sites can be suppressed by dividing the heating into two stages, with the temperature being set in the range of 350-500° C. in the first stage and in the range of 500-700° C. in the second stage, i.e., with the reduction being carried out at a higher temperature in the latter stage. (It is thought that this is because the high-temperature reduction in the second stage densifies the particles.) It is therefore preferable to conduct the reduction by heating in two stages.

The number of basic and acidic sites can be regulated by a method of magnetic powder particle surface treatment instead of said gentle oxidation treatment. One such method that can be used is to treat the surface of the magnetic powder with an alcohol and/or polyalcohol. Another is to treat the surface of the magnetic powder with a coupling agent such as a silane coupling agent.

Methods of surface treatment using a silane coupling agent will be explained. The treatment of the magnetic powder surface with a silane coupling agent can be carried out for example by adopting one of the following methods: (1) bringing the magnetic powder and the coupling agent into contact in a vapor phase to produce a polymerization reaction on the particle surfaces, (2) slurrying the magnetic powder with a diluting solution and adding the coupling agent to the slurry to produce a polymerization reaction on the particle surfaces or adding the magnetic powder to a solution containing the coupling agent to produce a polymerization reaction on the particle surfaces, and (3) diluting the coupling agent with water and/or alcohol to prepare a coupling solution, stirring the magnetic powder in a Henschel mixer or the like and dripping or spraying the coupling solution into the mixer to produce a polymerization reaction on the particle surfaces.

Since the magnetic powder to which the present invention applies is a very fine one having an average particle diameter of less than 70 nm, method (3) is preferably adopted. In this case, the individual particles are monodispersed and the entire surface of each particle is surface-treated. It is therefore preferable to implement a measure for dispersing the magnetic powder in the organic solvent so that the degree of dispersion β is not greater than 10, thereby ensuring that the entire surface of the magnetic powder prior to the surface treatment exhibits hydrophilicity. If the degree of dispersion β is defined as the ratio of Dfloc (average volume of the particles in the solvent determined by the dynamic light scattering method) to DTEM (average particle volume calculated from a transmission electron micrograph), i.e., the value of Dflock/DTEM, then this value represents the size of the secondary particles constituted of multiple agglomerated particles relative to the size of the actual primary particles.

Silane coupling agents usable in this invention can be represented by the following general formula:

where R' represents a vinyl group, epoxy group, styryl group, methacryl group, amino group, mercapto group, chloropropyl group or other organofunctional group and Y represents a hydrolytic alkoxy group or alkyl group bonded to Si.

The action of the silane coupling agent is for its Y side to strongly bond with the surface of the hydrophilic magnetic powder and its organofunctional group to bond with the resin of the coating, thereby producing a strong bond among the magnetic powder—silane coupling agent—resin. While R' can be any of the foregoing groups, it is preferably an epoxy group, amino group or methacryl group, more preferably an amino group or methacryl group, most preferably a methacryl group. From the practical viewpoint, however, it is best to select R' in accordance with the type of resin used to form the magnetic layer. Y can be any of a methoxy group, ethoxy group or the like but is preferably a methoxy group. In order to control the reactivity of the Y group portion, it can be changed to an alkyl group and used in a reactivity-reduced manner. The amount of silane coupling agent used should be decided in accordance with the specific surface area (BET) of the magnetic powder to which it is applied.

The dispersant used when surface treating the magnetic powder with the silane coupling agent can be an alcohol or ketone containing a polyol but the organic medium should be selected with consideration to compatibility with the coupling agent used. When utilizing an alcohol, it is preferable to use methanol, ethanol, 2-propanol or 1-butanol, more preferable to use methanol, ethanol or 2-propanol. The speed of the hydrolysis reaction can be controlled by adding to the treatment system a small amount of ammonia, acetic acid, hydrochloric acid or other such substance exhibiting a catalytic effect. The time period of the dispersion treatment varies from one dispersing machine to another but should be set to achieve a degree of dispersion β of not greater than a prescribed value. When the surface treatment with the silane coupling agent is carried out in this manner, a magnetic powder according to the present invention can be obtained wherein the number of basic sites is not greater than 0.85 site/nm$^2$ and the number of acidic sites is not greater than 0.75 site/nm$^2$. The values of the aforesaid ΔT and ΔC of this powder are less than 8.0° C. and less than 120 at. %, respectively.

The number of basic sites and the number of acidic sites of the magnetic powder can be regulated by simply treating the surface of the magnetic powder with an alcohol and/or polyalcohol instead of treating it with such a coupling agent. In this case, the magnetic powder is preferably dispersed in the alcohol and/or polyalcohol and then heated by the reflux method or in an autoclave. In the case of an easily oxidized magnetic powder, an inert gas should be blown into the alcohol before heating to thoroughly rid it of residual oxygen and the heating should then be conducted under an inert gas atmosphere. In experiments conducted by the inventor, it was found that when an acicular magnetic powder composed chiefly of Fe whose surface layer contains an oxide of at least one of Al, Si and Ra and whose average particle diameter (actually the average major axis length) is less than 70 nm is surface-treated with an alcohol and/or polyalcohol and regulated to have not greater than 0.85 basic site/nm$^2$ and not greater than 0.75 acidic site/nm$^2$, the value of the aforesaid ΔC is less than 120 at. %

EXAMPLES

The present invention will now be explained further with reference to working examples. The tests conducted for evaluating the magnetic properties, surface smoothness, durability and other properties of magnetic layers formed using magnetic powders according to the present invention were conducted by the following methods.

Tape Property Evaluation (1) Magnetic Coating Material Preparation 0.500 g of magnetic powder was weighed out and placed in a pot (inside diameter: 45 mm, depth: 13 mm) and allowed to stand for 10 min. with the cover open. Next, 0.700 mL of a vehicle [mixed solution of vinyl chloride resin MR-110 (22 wt %), cyclohexanone (38.7 wt %), acetylacetone (0.3 wt %), butyl stearate (0.3 wt %) and methyl ethyl ketone (MEK, 38.7%)] was added to the pot using a micropipette. A steel ball (2 φ) 30 g and ten nylon balls (8 φ) were immediately added to the pot and the pot was covered and allowed to stand for 10 min. The pot was then set in a centrifugal ball mill (Fritsch P-6) and gradually raised to a final rotating speed of 600 rpm, at which dispersion was continued for 60 min. The centrifugal ball mill was stopped and the pot removed. Using a micropipette, the pot was added with 1.8 mL of a liquid adjuster prepared in advance by mixing MEK and toluene at a ratio of 1:1. The pot was again set in the centrifugal ball mill and rotated at 600 rpm for 5 minutes. This completed the dispersion and the preparation of the magnetic coating material.

(2) Magnetic Tape Preparation

Upon completion of the foregoing dispersion, the cover of the pot was opened and the nylon balls removed. The coating material, together with the steel ball, was placed in an applicator (55 μm) and coated onto a support film (15 μm polyethylene film marketed by Toray Industries under the product designation 15C-B500). The coated film was promptly placed at the center of the coil of a 5.5 kG magnetic orientation device to orient its magnetic field, and then dried.

(3) Tape Property Evaluation

Magnetic property measurement: The coercive force Hcx, SFD and the like of the obtained tape were measured using a VSM (vibrating sample magnetometer, Model 1660 marketed by Nissho Iwai).

Tape surface smoothness (gloss): The gloss of the tape surface was measured using a glossmeter marketed by Nippon Denshoku Industries Co., Ltd. The measurement was conducted under condition of an angle of incidence of 60 degrees with the gloss at a prescribed incidence angle θ of a glass surface having a constant index of refraction of 1.567 over the whole range of visible light wavelengths defined as an index (100%).

(4) Preparation of Substrate for Durability Evaluation

Upon completion of the foregoing dispersion, the cover of the pot was opened and the nylon balls removed. The coating material, together with the steel ball, was placed in an applicator (55 μm) and coated onto a glass plate (4 cm length×15 cm width×1 mm thickness). The coated film was promptly placed at the center of the coil of a 5.5 kG magnetic orientation device to orient its magnetic field and then dried, thus completing preparation of a specimen substrate for durability evaluation.

Durability Evaluation (Steel Sliding Ball Test)

The glass plate coated with the specimen was attached to a sliding steel ball tester (Heidon-14DR marketed by Shinto Scientific Co., Ltd.) and a 10-mm diameter steel ball was slid thereon under a load of 5 g. The steel ball was run across the coated glass plate 580 times at a velocity of 2,320 mm/min (38.7 mm/sec). The condition of the surface over which the steel ball was slid was then observed (to determine whether the coating had been abraded through to the glass substrate) and the width of the scratch was measured using a 100× optical microscope.

Example 1

Iron oxyhydroxide starting material including Al, Y(yttrium), Si and Co was dehydrated and baked, then reduced under heating in a hydrogen atmosphere to obtain an acicular metallic magnetic powder having an average major axis length of 61 nm, an Al content expressed as Al/Fe atomic percent of 11.6 at. %, Y content expressed as Y/Fe (indicated as R/Fe in Table 1) atomic percent of 9.6 at. %, Co (cobalt) content expressed as Co/Fe atomic percent of 24.1 at. %, and Si (silicon) content expressed as Si/Fe atomic percent of 0.1 at. %. The magnetic powder was processed as described below. The reduction under heating in a hydrogen atmosphere was conducted by the two-stage method using a heating temperature of 440° C. in the first stage and heating temperature of 550° C. in the ensuing second stage.

After the reduction, the magnetic powder was subjected to gentle oxidation treatment at 80° C. in a low oxidizing atmosphere, the oxygen content of the gentle oxidation stage varying from 0.1 vol. % at the start to 1.0 vol. % at the end of the stage, next to heat treatment in an $N_2$ atmosphere at 180° C. for 30 min, and then again to same gentle oxidation treatment at 80° C. It was further subjected to heat treatment in a hydrogen atmosphere containing 10 vol. % of $H_2O$ at 350° C. for 30 min and then to same gentle oxidation treatment at 80° C.

The numbers of basic and acidic sites of the obtained magnetic powder were calculated from the $CO_2$ adsorption and $NH_3$ adsorption measured by the methods set out earlier. The magnetic powder had 0.46 basic site/nm$^2$ and 0.69 acidic site/nm². The properties of the magnetic powder were measured. The results are shown in Table 1.

Example 2

An acicular metallic magnetic powder like that of Example 1 except for having an average major axis length of 45 nm, Al/Fe of 12.2 at. %, Y/Fe of 9.5 at. % and Co/Fe of 23.8 at. % was under the same conditions as in Example 1 subjected to two-stage reduction→gentle oxidation treatment→low-temperature heat treatment in an inert atmosphere→gentle oxidation treatment→high-temperature heat treatment in a wet hydrogen atmosphere→gentle oxidation treatment.

The obtained magnetic powder had 0.71 basic site/nm² and 0.63 acidic site/nm². The properties of the magnetic powder were measured as in Example 1. The results are shown in Table 1.

Example 3

Iron oxy-hydroxide starting material including Al, Y and Co was dehydrated and baked, then reduced under heating in a hydrogen atmosphere to obtain an acicular metallic magnetic powder having an average major axis length of 45 nm, an Al content expressed as Al/Fe atomic percent of 11.3 at. %, Y content expressed as Y/Fe atomic percent of 9.6 at. %, and Co content expressed as Co/Fe atomic percent of 23.7 at. %. The magnetic powder was processed as described below. The reduction under heating in a hydrogen atmosphere was conducted by the two-stage method using a heating temperature of 440° C. in the first stage and heating temperature of 550° C. in the ensuing second stage.

The magnetic powder as obtained by the reduction was directly dispersed in alcohol under a nitrogen atmosphere. A coupling agent (γ-methacryloxy propyl trimethoxy silane) was stirred into the dispersion in an amount such that the Si content of the magnetic powder measured after processing was 2.2 at. % expressed as Si/Fe. Pure water was then added to conduct hydrolysis, followed by aging.

The obtained magnetic powder had 0.00 basic site/nm² and 0.42 acidic site/nm². The properties of the magnetic powder were measured as in Example 1. The results are shown in Table 1.

Example 4

An acicular metallic magnetic powder like that of Example 3 except for having an average major axis length of 33 nm, Al/Fe of 26 at. %, Y/Fe of 16.1 at. % and Co/Fe of 23.7 at. % was under the same conditions as in Example 3 subjected to two-stage reduction→silane coupling treatment. However the amount coupling agent added was such that the Si content of the magnetic powder measured after processing was 4.6 at. % expressed as Si/Fe.

The obtained magnetic powder had 0.00 basic site/nm² and 0.39 acidic site/nm². The properties of the magnetic powder were measured as in Example 1. The results are shown in Table 1.

Comparative Example 1

Example 2 was repeated except that Y/Fe was changed from 9.5 to 19.1 at. %. (The contents of the other components differed slightly from those in Example 2 owing to difficulty of exact replication but were within allowable ranges.) The obtained acicular metallic magnetic powder had 1.09 basic sites/nm² and 0.57 acidic site/nm². The properties of the magnetic powder were measured as in Example 1. The results are shown in Table 1.

Comparative Example 2

Example 4 was repeated except that silane coupling treatment was not conducted. However, in order to prevent surface oxidation, the acicular metallic magnetic powder after the two-stage reduction was subjected to gentle oxidation at 80° C. in an oxidizing atmosphere, heat treatment in an $N_2$ atmosphere at 180° C. for 30 min, and again to same gentle oxidation at 80° C.

The obtained magnetic powder had 0.62 basic site/nm² and 0.87 acidic site/nm². The properties of the magnetic powder were measured as in Example 1. The results are shown in Table 1.

Comparative Example 3

An acicular metallic ferromagnetic magnetic powder was obtained in the manner of Example 1 except that the reduction step was conducted in a single stage at 450° C. In order to prevent surface oxidation, the magnetic powder was subjected to gentle oxidation at 80° C. in an oxidizing atmosphere, heat treatment in an $N_2$ atmosphere at 180° C. for 30 min, and again to same gentle oxidation at 80° C. Unlike in Example 1, however, high-temperature heat treatment in a wet hydrogen atmosphere was not conducted The obtained magnetic powder had 0.53 basic site/nm² and 0.87 acidic site/nm². The properties of the magnetic powder were measured as in Example 1. The results are shown in Table 1.

TABLE 1

| | Powder properties | | | | | | | | | | |
|---|---|---|---|---|---|---|---|---|---|---|---|
| | Av. particle | | Composition | | | | Gas saturation adsorption | | | Basic | Acidic | |
| | diameter Nm | BET m²/g | Al/Fe at. % | Co/Fe at. % | Si/Fe at. % | Ra/Fe at. % | $NH_3$ μL/g | $CO_2$ μL/g | Total μL/g | sites Sites/nm² | sites Sites/nm² | Total Sites/nm² |
| Example 1 | 61 | 66 | 11.6 | 24.1 | <0.1 | 9.6 | 1809 | 1211 | 3020 | 0.45 | 0.68 | 1.14 |
| Example 2 | 45 | 73 | 12.2 | 23.8 | <0.1 | 9.5 | 1843 | 2058 | 3901 | 0.70 | 0.63 | 1.33 |
| Example 3 | 45 | 65 | 11.3 | 23.7 | 2.2 | 9.6 | 1085 | 0 | 1085 | 0.00 | 0.42 | 0.42 |
| Example 4 | 33 | 89 | 26 | 23.7 | 4.6 | 16.1 | 1380 | 0 | 1380 | 0.0 | 0.39 | 0.39 |
| Comparative Example 1 | 45 | 75 | 12.6 | 23.2 | <0.1 | 19.1 | 1697 | 3264 | 4961 | 1.08 | 0.57 | 1.64 |
| Comparative Example 2 | 32 | 106 | 25.2 | 22.3 | <0.1 | 15.2 | 3688 | 2609 | 6297 | 0.61 | 0.87 | 1.48 |
| Comparative Example 3 | 60 | 88 | 11.6 | 24.1 | <0.1 | 9.6 | 3062.35 | 1856.59 | 4918.94 | 0.53 | 0.87 | 1.40 |

TABLE 1-continued

| | Magnetic properties | | | | | | | | Condensation product generation | | Tape evaluation | |
| --- | --- | --- | --- | --- | --- | --- | --- | --- | --- | --- | --- | --- |
| | Powder properties | | | | Tape properties | | | | | | Surface Smoothness | Durability |
| | HC kA/m | Ps Am²/kg | SQ [-] | ΔPs % | Hcx kA/m | SFDx [-] | SQx [-] | OR [-] | ΔT °C. | ΔC at. % | Gloss % | Scratch width mm |
| Example 1 | 197.5 | 127 | 0.530 | 20 | 209.8 | 0.400 | 0.79 | 1.8 | 7.9 | 91 | 90 | 0.15 |
| Example 2 | 176.5 | 120 | 0.520 | 22 | 199.8 | 0.510 | 0.85 | 2.2 | 7.5 | 79 | 75 | 0.11 |
| Example 3 | 165.8 | 115 | 0.493 | 9 | 214.3 | 0.472 | 0.87 | 2.8 | 1.8 | 7 | 140 | 0.08 |
| Example 4 | 107.1 | 85 | 0.440 | 15 | 143.2 | 1.064 | 0.81 | 2.7 | 1.5 | 0 | 120 | 0.09 |
| Comparative Example 1 | 178.7 | 111 | 0.520 | 23 | 204.6 | 0.520 | 0.85 | 2.1 | 8.1 | 150 | 40 | Reached substrate (0.37) |
| Comparative Example 2 | 111.1 | 92 | 0.460 | 35 | 141.3 | 1.110 | 0.80 | 2.2 | 9.6 | 228 | 30 | Reached substrate (0.43) |
| Comparative Example 3 | 179.0 | 101 | 0.514 | 40 | 199.3 | 0.564 | 0.76 | 1.8 | 13.7 | 215% | 40 | Reached substrate (0.39) |

As can be seen from Table 1, the magnetic powders of Examples 1-4 having not greater than 0.85 basic site/nm² and not greater than 0.75 acidic site/nm² all had ΔT of less than 8.0° C. and ΔC of less than 120 at. % and exhibited excellent tape surface smoothness and durability.

In contrast, the magnetic powder of Comparative Example 1, which had 0.57 acidic site/nm², fewer than the maximum of 0.75 stipulated by the present invention, but had 1.05 basic site/nm², greater than the maximum of 0.85 stipulated by the present invention, had a high ΔC of 150 at. % and was inferior in tape surface smoothness and poor in durability.

On the other hand, the magnetic powders of Comparative Examples 2 and 3, which had 0.62 and 0.53 basic site/nm², fewer than the maximum of 0.85 stipulated by the present invention, but had 0.85 acidic site/nm², greater than the maximum of 0.75 stipulated by the present invention, were both high in ΔT and ΔC and were inferior in tape surface smoothness and durability.

The following conclusions can be drawn from the test results:
(1) When the magnetic powder after reduction was heat-treated as in Example 1 (350° C.×30 min) the number of basic sites and the number of acidic sites could be lowered to the values specified by the present invention, but when this heat treatment was omitted as in Comparative Example 3, the number of acidic sites became great.
(2) Comparative Example 1 differed from Example 2 only in the point of having high Y content (Y/Fe=19.1 at. %) but when the Ra content was high as in Comparative Example 1, the amount of Ra oxide on the particle surfaces became great to increase the number of basic sites and acidic sites to such an extent that the conditions prescribed by the present invention could not be satisfied
(3) When silane coupling treatment was conducted as in Example 3, the number of basic sites and the number of acidic sites were smaller than when this treatment was not conducted, as in Comparative Example 3.

What is claimed is:

1. A magnetic powder consisting of particles composed chiefly of Fe whose surface layer contains an oxide of at least one of Al, Si and Ra (where Ra represents one or more rare earth elements, defined as including Y), which magnetic powder has an average particle diameter of less than 70 nm, the number of basic sites on the particle surface of not greater than 0.85 sites/nm², and the number of acid sites on the particle surface of not greater than 0.75 sites/nm².

2. A magnetic powder according to claim 1, wherein an oxide of Ra is contained on the surface layer, an Ra content expressed as Ra/Fe atomic percent being less than 10 at. %.

3. A magnetic recording medium comprising a magnetic layer formed from the magnetic powder of claim 1.

4. A magnetic recording medium comprising a magnetic layer formed from the magnetic powder of claim 2.

* * * * *